United States Patent
Creamer et al.

(10) Patent No.: US 6,954,522 B2
(45) Date of Patent: Oct. 11, 2005

(54) CALLER IDENTIFYING INFORMATION ENCODED WITHIN EMBEDDED DIGITAL INFORMATION

(75) Inventors: Thomas E. Creamer, Boca Raton, FL (US); Peeyush Jaiswal, Boca Raton, FL (US); Victor S. Moore, Boynton Beach, FL (US)

(73) Assignee: International Business Machines Corporation, Armonk, NY (US)

( * ) Notice: Subject to any disclaimer, the term of this patent is extended or adjusted under 35 U.S.C. 154(b) by 55 days.

(21) Appl. No.: 10/736,257

(22) Filed: Dec. 15, 2003

(65) Prior Publication Data

US 2005/0129202 A1 Jun. 16, 2005

(51) Int. Cl.⁷ ............................................... H04M 1/56
(52) U.S. Cl. ............................................... 379/142.14
(58) Field of Search ............................ 379/41, 52, 67.1, 379/68, 71, 80, 85, 88.01, 88.02, 88.04, 88.07, 379/88.13, 88.14, 100.13, 93.23, 142.14, 379/142.01, 142.06, 142.17, 202.01; 455/412.1, 455/415

(56) References Cited

U.S. PATENT DOCUMENTS

| | | |
|---|---|---|
| 4,805,205 A | 2/1989 | Faye |
| 5,319,735 A | 6/1994 | Preuss et al. |
| 5,519,780 A | 5/1996 | Woo et al. |
| 5,559,875 A | 9/1996 | Bieselin et al. |
| 5,893,067 A | 4/1999 | Bender et al. |
| 5,963,217 A | 10/1999 | Grayson et al. |
| 6,201,859 B1 | 3/2001 | Memhard et al. |
| 6,611,607 B1 | 8/2003 | Davis et al. |
| 2002/0049984 A1 | 4/2002 | Klappert |
| 2002/0067812 A1 | 6/2002 | Fellingham et al. |
| 2003/0044002 A1 | 3/2003 | Yeager et al. |

FOREIGN PATENT DOCUMENTS

JP 2001060098 3/2001

*Primary Examiner*—Rexford Barnie
(74) *Attorney, Agent, or Firm*—Akerman Senterfitt

(57) ABSTRACT

A method of providing caller information can include receiving a voice signal, detecting portions of the voice signal that are inaudible using a perceptual audio processor, replacing the inaudible portions of the voice signal with digital caller information, and transmitting the resulting voice signal specifying the digital caller information.

24 Claims, 1 Drawing Sheet

CALLER IDENTIFYING INFORMATION ENCODED WITHIN EMBEDDED DIGITAL INFORMATION

BACKGROUND

1. Field of the Invention

The invention relates to communications systems and, more particularly, to conveying caller identifying information over a communications system.

2. Description of the Related Art

Caller Identification (CID), or Calling Number Delivery (CND) is a telephony service which provides a calling party's name and/or number to the called party. Many persons rely upon CID to determine the identity of a calling party prior to answering a received telephone call. The CID information is transmitted on the subscriber loop using frequency shift keyed (FSK) modem tones. These FSK modem tones are used to transmit the display message in American Standard Code for Information Interchange (ASCII) character code form. The transmission of the display message takes place between the first and second ring. The information sent can include the date, time, and calling number. The name associated with the calling number is sometimes included as well. The CID data is not sent once the call is established. In consequence, the CID data is not resent during the call.

As such, CID can be of limited use in the context of conference calls. With respect to conference calls, once each participant is connected, it can be difficult for a listener to discern the identity of a speaking party. This may result from the listener's unfamiliarity with the speaker or that several of the conference call participants sound alike.

SUMMARY OF THE INVENTION

The present invention provides a method, system, and apparatus for including caller identifying information within a voice stream over a telephony connection. More particularly, the present invention can analyze a received voice signal and determine portions of the voice signal that are not likely to be perceived by a listener. The portions of the voice signal deemed inaudible can be replaced with caller identifying information. The resulting voice information can be sent over the telephone call. Notably, the present invention allows such information to be repeatedly sent throughout the duration of a telephone call.

One aspect of the present invention can include a method of providing caller information. The method can include receiving a voice signal, detecting portions of the voice signal that are inaudible using a perceptual audio processor, replacing the inaudible portions of the voice signal with digital caller information, and transmitting the resulting voice signal specifying the digital caller information. For example, the digital caller information can be for a call participant such that the resulting voice signal specifying the digital caller information is sent to a different call participant over an established telephone call.

According to one embodiment of the present invention, the identifying step can be performed using a psychoacoustic model to identify the inaudible portions of the voice signal. The digital caller information can specify at least one of an identity of the call participant and a telephone number of the call participant.

The present invention further can include receiving the voice signal including the digital caller information and decoding the digital caller information. A representation of the digital caller information can be presented. An audio representation of the received voice signal also can be played. Notably, the audio representation of the received voice signal can be played substantially concurrently with the presentation of the digital caller information.

Other embodiments of the present invention can include a system having means for performing the various steps disclosed herein and a machine readable storage for causing a machine to perform the steps described herein.

BRIEF DESCRIPTION OF THE DRAWINGS

There are shown in the drawings, embodiments which are presently preferred, it being understood, however, that the invention is not limited to the precise arrangements and instrumentalities shown.

DETAILED DESCRIPTION OF THE INVENTION

Figure 1:
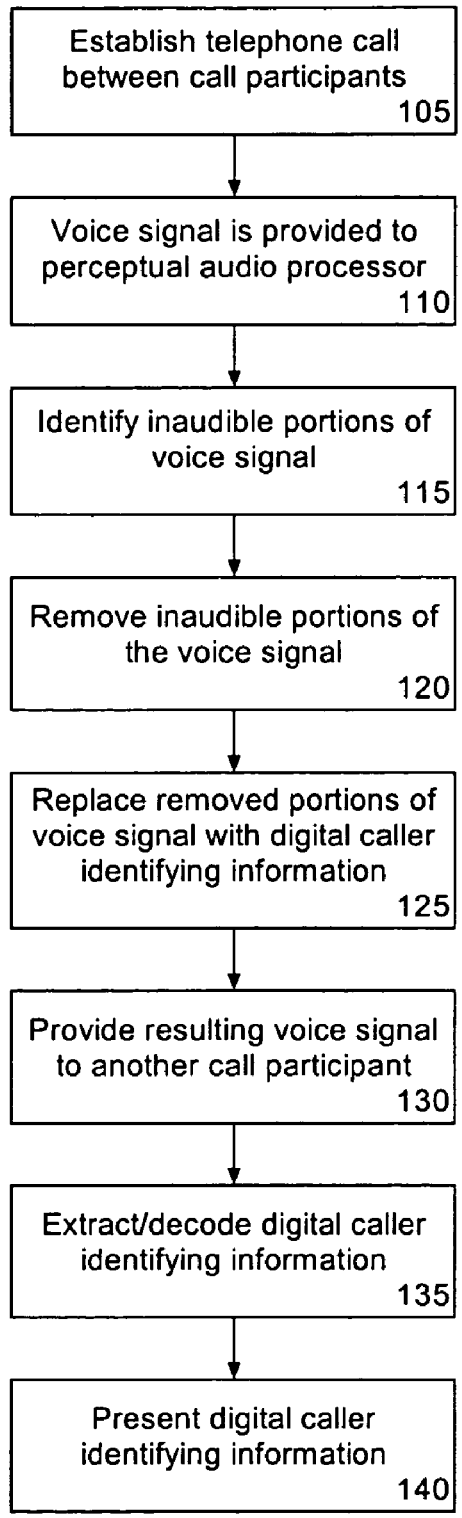
FIG. 1 is a flow chart illustrating a method of including caller identifying information within a voice stream over a telephony connection in accordance with the inventive arrangements disclosed herein.

The present invention provides a solution for including caller identifying information within a voice stream over a telephony connection. More particularly, the present invention can identify portions of a received voice signal that are not likely to be perceived by a listener. The identified portions of the voice signal, i.e. those deemed inaudible, can be replaced with caller identifying information. Caller identifying information can include, but is not limited to, a call participant identity, telephone number, current date, and current time. The resulting voice information can be sent over the telephone call to another call participant. Notably, the present invention allows such information to be repeatedly sent over an established telephone call.

The present invention utilizes a perceptual audio processor, similar to a perceptual codec, to analyze a received voice signal. A perceptual codec is a mathematical description of the limitations of the human auditory system and, therefore, human auditory perception. Examples of perceptual codecs can include, but are not limited to MPEG Layer-3 codecs and MPEG Layer-4 codecs. The perceptual audio processor is substantially similar to the perceptual codec with the noted exception that the perceptual audio processor can, but need not implement, a second stage of compression as is typical with perceptual codecs.

The perceptual audio processor, similar to a perceptual codec, includes a psychoacoustic model to which source material, in this case a voice signal from a call participant, can be compared. By comparing the voice signal with the stored psychoacoustic model, the perceptual codec identifies portions of the voice signal that are not likely, or are less likely to be perceived by a listener. These portions are referred to as being inaudible. Typically a perceptual codec removes such portions of the source material prior to encoding.

FIG. 1 is a flow chart illustrating a method 100 of including caller identifying information within a voice stream over a telephony connection in accordance with the inventive arrangements disclosed herein. The method can begin in step 105 where a call is established, whether a call between two participants or a conference call between more than two participants. In step 110, the voice signal of a speaking call participant (speaker) can be provided to the perceptual audio processor. The perceptual audio processor can identify which portions of the received audio signal are inaudible in step 115. As noted, the perceptual audio processor can determine which portions of the voice signal are inaudible using a psychoacoustic model.

For example, humans tend to have sensitive hearing between approximately 2 kHz and 4 kHz. The human voice occupies the frequency range of approximately 500 Hz to 2 kHz. As such, a perceptual codec can remove portions of a voice signal, for example those portions below approximately 500 Hz and above approximately 2 kHz, without rendering the resulting voice signal unintelligible. This leaves sufficient bandwidth within a telephony signal within which digital caller information can be encoded and sent within the voice stream.

The perceptual audio processor further can detect sounds that are effectively masked or made inaudable by other sounds. For example, the perceptual audio processor can identify cases of auditory masking where portions of the voice signal are masked by other portions as a result of perceived loudness and/or temporal masking where portions of the voice signal are masked due to the timing of sounds within the voice signal.

It should be appreciated that as determinations regarding which portions of a voice signal are inaudible are based upon a psychoacoustic model, some users will be able to detect a difference should those portions be removed from the voice signal. In any case, inaudible can include those portions of a voice signal as determined from a perceptual audio processor that, if removed, will not render the voice signal unintelligible or prevent a listener from understanding the content of the voice signal. Accordingly, the various frequency ranges disclosed herein are offered as examples only and are not intended as a limitation of the present invention.

In step 120, the perceptual audio processor can remove the identified portions, i.e. those identified as inaudible, from the voice signal. In step 125, digital caller information can be added in place of the removed portions of the voice signal. That is, the perceptual audio processor replaces the inaudible portions of the voice signal with digital caller information. As noted, the digital caller information can include, but is not limited to, the identity of the speaker, for example a name, and the speaker's telephone number. Still, the digital caller information can specify the current time and date. In step 130, the voice signal is provided to another call participant as a digital voice stream having embedded digital identifying information.

In step 135, the digital caller information can be decoded in the receiving party's telephony device, which is configured to extract and decode such information, or a device attached to the receiving party's telephony equipment. The caller identifying information then can be presented to the receiving party in a visual format or played through an audio interface in step 140.

Notably, the caller identifying information can be received with the speaker's voice stream such that the receiving party is able to be presented with the caller identifying information of the speaker while engaged in the telephone call and hearing the speaker's voice. As the digital caller information is transmitted within the digital voice stream, such information can be sent repeatedly throughout the duration of a call. Accordingly, caller identifying information can be made available to a call participant at any time during a call.

In one embodiment, the present invention can be disposed within a telephony switching system or other central office equipment. In that case, caller identifying information can be obtained by querying a network data base using each participant's telephone number or by using CID. Further, each call participant can be identified by the particular voice channel over which that caller is communicating. The perceptual audio processor can be implemented as a digital signal processing (DSP) unit.

In the case where the perceptual audio processor is located within a call participant's telephony equipment, the caller identifying information can be stored within the perceptual audio processor or within the call participant's telephony equipment such that the information is made available to the perceptual audio processor.

Further, in one embodiment, a receiving party or subscriber can specify which voice stream is to be analyzed, for example by keying in a telephone number of the party or voice source. Such an embodiment can be useful in the context of conference calls. In another embodiment, caller identifying information can be included within each voice stream allowing the receiving party to receive caller identifying information for each call participant as that party speaks. Each caller can be identified by the particular voice channel over which the speaker's voice is carried. In any case, the examples disclosed herein are not intended as a limitation of the present invention.

The method 100 has been provided for purposes of illustration only. As such, it should be appreciated that one or more of the steps disclosed herein can be performed in differing order depending upon the particular configuration of the present invention. For example, the subscriber can invoke the voice analysis service at any time prior to a call or during a call. Additionally, the present invention can be used regardless of whether the subscriber initiates a call or receives a call.

The present invention can be realized in hardware, software, or a combination of hardware and software. The present invention can be realized in a centralized fashion in one computer system, or in a distributed fashion where different elements are spread across several interconnected computer systems. Any kind of computer system or other apparatus adapted for carrying out the methods described herein is suited. A typical combination of hardware and software can be a general purpose computer system with a computer program that, when being loaded and executed, controls the computer system such that it carries out the methods described herein.

The present invention also can be embedded in a computer program product, which comprises all the features enabling the implementation of the methods described herein, and which when loaded in a computer system is able to carry out these methods. Computer program in the present context means any expression, in any language, code or notation, of a set of instructions intended to cause a system having an information processing capability to perform a particular function either directly or after either or both of the following: a) conversion to another language, code or notation; b) reproduction in a different material form.

This invention can be embodied in other forms without departing from the spirit or essential attributes thereof. Accordingly, reference should be made to the following claims, rather than to the foregoing specification, as indicating the scope of the invention.

What is claimed is:

1. A method of providing caller information comprising:
   receiving a voice signal;
   detecting portions of the voice signal that are inaudible using a perceptual audio processor;
   replacing the inaudible portions of the voice signal with digital caller information; and transmitting the resulting voice signal specifying the digital caller information.

2. The method of claim 1, wherein the digital caller information is associated with a call participant, said transmitting step comprising sending the resulting voice signal specifying the digital caller information to a different call participant over an established telephone call.

3. The method of claim 2, wherein the digital caller information specifies at least one of an identity of the call participant and a telephone number of the call participant.

4. The method of claim 1, said identifying step comprising using a psychoacoustic model to identify the inaudible portions of the voice signal.

5. The method of claim 1, further comprising:
receiving the voice signal specifying the digital caller information; and
decoding the digital caller information.

6. The method of claim 5, further comprising presenting a representation of the digital caller information.

7. The method of claim 6, further comprising playing an audio representation of the received voice signal.

8. The method of claim 7, wherein the audio representation of the received voice signal is played substantially concurrently with the presentation of the digital caller information.

9. A system for providing caller information:
means for receiving a voice signal;
means for detecting portions of the voice signal that are inaudible using a perceptual audio processor;
means for replacing the inaudible portions of the voice signal with digital caller information; and
means for transmitting the resulting voice signal specifying the digital caller information.

10. The system of claim 9, wherein the digital caller information is associated with a call participant, said means for transmitting comprising means for sending the resulting voice signal specifying the digital caller information to a different call participant over an established telephone call.

11. The system of claim 10, wherein the digital caller information specifies at least one of an identity of the call participant and a telephone number of the call participant.

12. The system of claim 9, said means for identifying comprising a psychoacoustic model for identifying the inaudible portions of the voice signal.

13. The system of claim 9, further comprising:
means for receiving the voice signal specifying the digital caller information; and
means for decoding the digital caller information.

14. The system of claim 13, further comprising means for presenting a representation of the digital caller information.

15. The system of claim 14, further comprising means for playing an audio representation of the received voice signal.

16. The system of claim 15, wherein the audio representation of the received voice signal is played substantially concurrently with the presentation of the digital caller information.

17. A machine readable storage, having stored thereon a computer program having a plurality of code sections executable by a machine for causing the machine to perform the steps of:
receiving a voice signal;
detecting portions of the voice signal that are inaudible using a perceptual audio processor;
replacing the inaudible portions of the voice signal with digital caller information; and
transmitting the resulting voice signal specifying the digital caller information.

18. The machine readable storage of claim 17, wherein the digital caller information is associated with a call participant, said transmitting step comprising sending the resulting voice signal specifying the digital caller information to a different call participant over an established telephone call.

19. The machine readable storage of claim 18, wherein the digital caller information specifies at least one of an identity of the call participant and a telephone number of the call participant.

20. The machine readable storage of claim 17, said identifying step comprising using a psychoacoustic model to identify the inaudible portions of the voice signal.

21. The machine readable storage of claim 17, further comprising:
receiving the voice signal specifying the digital caller information; and
decoding the digital caller information.

22. The machine readable storage of claim 21, further comprising presenting a representation of the digital caller information.

23. The machine readable storage of claim 22, further comprising playing an audio representation of the received voice signal.

24. The machine readable storage of claim 23, wherein the audio representation of the received voice signal is played substantially concurrently with the presentation of the digital caller information.

* * * * *